March 5, 1963   H. VAN DEVENDER   3,080,015
DEMOUNTABLE BENCH
Filed June 28, 1961
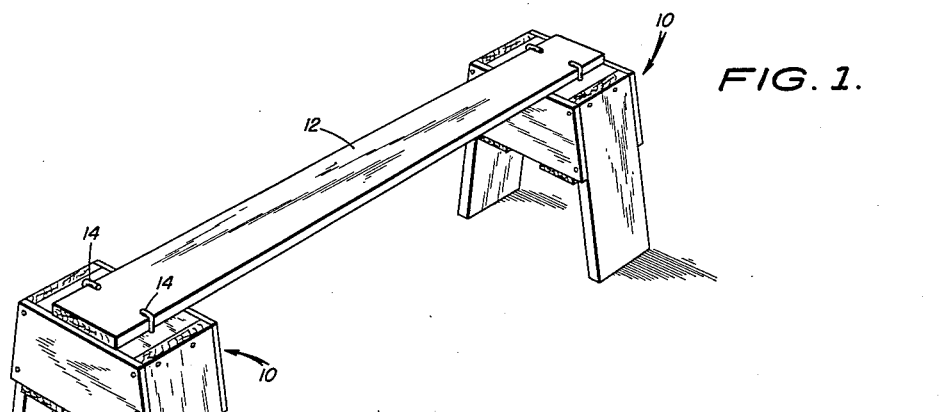
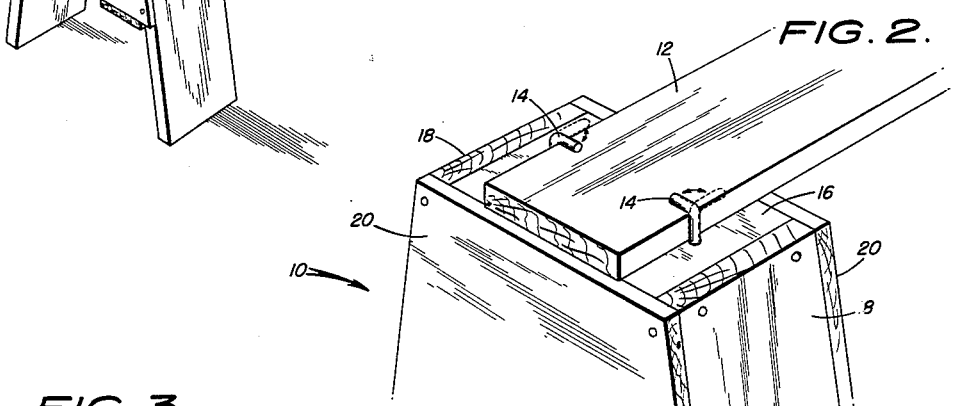
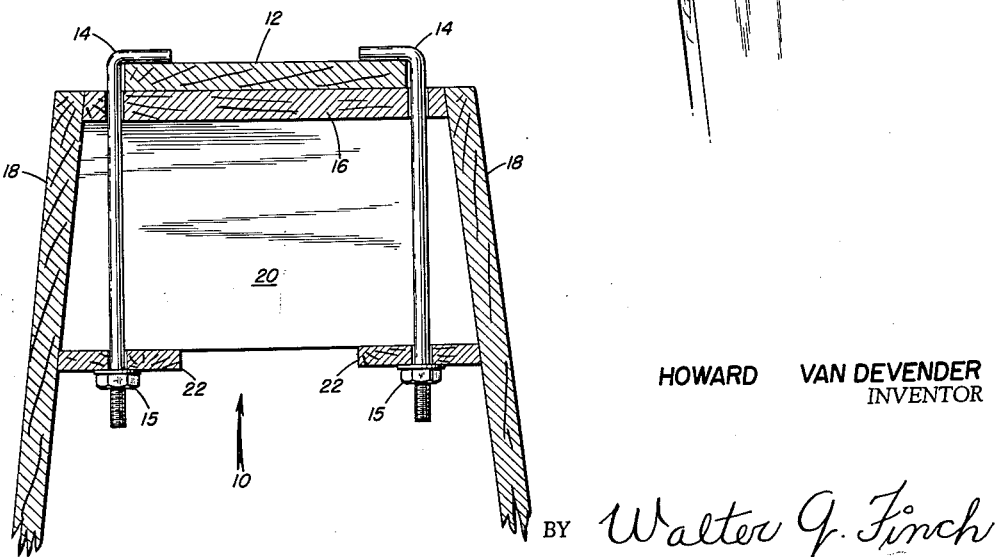
HOWARD VAN DEVENDER
INVENTOR
BY Walter G. Finch
ATTORNEY United States Patent Office 3,080,015
Patented Mar. 5, 1963

3,080,015
DEMOUNTABLE BENCH
Howard Van Devender, 2132 Maisel St.,
Baltimore 30, Md.
Filed June 28, 1961, Ser. No. 120,225
2 Claims. (Cl. 182—181)

This invention relates generally to supports and more particularly it pertains to a portable, knockdown, platform-type bench for wall and ceiling workmen, such as painters or plasterers.

Saw horses are commonly used in pairs to support planking to provide a walk-platform for workmen. For stability, such saw horses are made with widely spread legs generally in two planes and must be relatively wide. The transport of such saw horses from job to job is difficult unless a truck or large vehicle is available.

It is an object of this invention to provide a portable, knock-down bench which is small, light weight and easily assembled to form a sturdy, safe support for workmen.

Another object of this invention is to provide a bench which is adjustable in length.

Still another object of this invention is to provide a bench whose support platform can be furnished by any thickness of plank usually found as scrap lumber at construction sites.

Yet another object of the invention is to provide trestles for a knock-down platform which can be nested for easy transport.

These and other objects and attendant advantages of this invention will become more readily apparent and understood from the following detailed specification and single sheet of accompanying drawings in which:

FIG. 1 is a perspective view of an improved demountable bench incorporating features of this invention;

FIG. 2 is an enlarged detail perspective view of one end of the bench shown in FIG. 1; and FIG. 3 is a lateral section taken on a vertical centerline of a trestle.

Referring now to the details of the drawings, the invention consists of a pair of spaced trestles 10 to which a walkway or plank 12 is detachably secured as shown in FIG. 1.

Each trestle 10 comprises generally a pair of elongated board legs 18 secured in a divergent spaced relationship by a pair of sides 20 nailed to their opposite upper edges as best shown in FIG. 2.

A top 16 closes the upper opening thus formed by the sides 20 and legs 18 and is secured as shown to the upper ends of the latter.

A spaced pair of coplanar arranged cleats 22 span the lower opening and are secured as shown in FIG. 3 to the bottom edges of the sides 20, each positioned against a leg 18.

A right angle head bolt 14 is passed vertically downwardly through the top 16 and through each cleat 22 and it is provided with a nut and washer 15.

When assembling the plank 12 to the trestles 10, it is only necessary to rotate the angle heads of the bolts 14 as shown by the curved arrows in FIG. 2 for a secure anchorage thereof upon tightening the nuts 15. It also is obvious that, in the knocked down condition, a pair of trestles 10 can, with great space saving, be nested one with the other because of the diverging legs 18 and relatively narrow width.

Sufficient thread length in the bolts 14 assures ample adaption of the trestles 10 to any thickness of plank 12 and furthermore any length of plank can be accommodated to suit the working conditions. A plank 12 so clamped will never slip nor will the trestles 10 independently tip over as is possible with the usual saw horses. If desired, a number of parallel coplanar planks 12 can be used, with trestles 10 of greater width if it is desired to widen the width of the bench for greater working area.

Obviously, many modifications and variations of the present invention are possible in the light of the above teachings. It is, therefore, to be understood that within the scope of the appended claims the invention may be practiced otherwise than as specifically described.

What is claimed is:

1. A portable platform demountable type bench, comprising, a pair of parallel spaced trestles, each said trestle having oppositely positioned divergent spaced legs, oppositely positioned side members securing said divergent spaced legs together, a top for said divergent spaced legs and side members terminating in a common plane, and a pair of coplanar arranged cleat members secured to said side members and abutting against said divergent spaced legs and spaced parallel to said top thereof, one trestle of said pair being nestable with the other trestle of said pair when said demountable bench is disassembled with the cleat members of said one trestle resting on the top of said other trestle therebeneath; a walkway supported by said tops of said spaced trestles and arranged substantially transversely to said side members thereof, oppositely positioned rotatably mounted means for detachably securing the top of said walkway to each of said spaced trestles, each said means including a rod member having a right angle head on one end for engaging with the top surface of said walkway, apertures in the top and cleat members of each said spaced trestle, said rod member passing through said apertures in its respective top and cleat member, and means cooperating with the opposite end of each said member for drawing and tightening said walkway to its respective cleat member, whereby said walkway is secured to said pair of spaced trestles.

2. A portable platform demountable type bench, comprising, a pair of parallel spaced trestles, each said trestle having oppositely positioned divergent spaced legs, oppositely positioned side members securing said divergent spaced legs together, a top for said divergent spaced legs and side members terminating in a common plane, and a pair of coplanar arranged cleat members secured to said side members and abutting against said divergent spaced legs and parallel to said top thereof, one trestle of said pair being nestable with the other trestle of said pair when said demountable bench is disassembled with the cleat members of said trestle resting on the top of said other trestle therebeneath; a walkway supported by said tops of said spaced trestles and arranged substantially transversely to said side members thereof, oppositely positioned rotatably mounted means for detachably securing the top of said walkway to each of said spaced trestles, each said means including a rod member having a right angle head on one end for engaging with the top surface of said walkway, apertures in the top and cleat members of each said trestle, said rod member passing through said apertures in its respective top and cleat member with the opposite end of said rod member being threaded, and means threadedly engaging the opposite end of said rod member for tightening said right angle head of said rod member and walkway to its respective cleat member, whereby said walkway is positively secured to said spaced trestles.

References Cited in the file of this patent

UNITED STATES PATENTS

| | | |
|---|---|---|
| 1,079,606 | Rooney | Nov. 25, 1913 |
| 1,359,452 | Walker | Nov. 16, 1920 |
| 1,685,668 | Davis | Sept. 25, 1928 |
| 2,086,304 | Schwemlein et al. | July 6, 1937 |
| 2,281,039 | Jones | Apr. 28, 1942 |
| 2,295,183 | Perreault | Sept. 8, 1942 |
| 2,496,526 | Falcone | Feb. 7, 1950 |
| 2,664,319 | Doucette | Dec. 29, 1953 |
| 2,706,662 | Brown | Apr. 19, 1955 |
| 2,961,061 | Buckles | Nov. 22, 1960 |

FOREIGN PATENTS

| | | |
|---|---|---|
| 6,804 | Great Britain | 1892 |
| 737,637 | Great Britain | Sept. 28, 1955 |